United States Patent [19]

Kurihara

[11] Patent Number: 4,718,527
[45] Date of Patent: Jan. 12, 1988

[54] HUB CLUTCH

[75] Inventor: Sakuo Kurihara, Tochigi, Japan

[73] Assignee: Tochigi-Fuji Sangyo Kabushiki Kaisha, Tochigi, Japan

[21] Appl. No.: 821,551

[22] Filed: Jan. 22, 1986

[30] Foreign Application Priority Data

Jan. 23, 1985 [JP] Japan .............................. 60-7894[U]
Feb. 18, 1985 [JP] Japan ............................ 60-21448[U]
May 11, 1985 [JP] Japan ............................ 60-69821[U]

[51] Int. Cl.$^4$ ........................ F16D 1/06; F16D 43/20
[52] U.S. Cl. ...................................... 192/54; 192/35; 192/67 R; 192/93 R; 403/1
[58] Field of Search .............. 192/35, 49, 67 R, 93 A, 192/54, 93 R, 31, 36; 403/1

[56] References Cited

U.S. PATENT DOCUMENTS

| | | | |
|---|---|---|---|
| 4,237,821 | 5/1982 | Telford | 192/54 X |
| 4,238,014 | 12/1980 | Petrau | 192/54 |
| 4,281,749 | 8/1981 | Fogelberg | 192/36 |
| 4,282,959 | 8/1981 | Schachner | 192/35 |
| 4,343,386 | 8/1982 | Schaefer et al. | 192/54 |

*Primary Examiner*—Carl D. Friedman
*Assistant Examiner*—Richard E. Chilcot, Jr.
*Attorney, Agent, or Firm*—Wenderoth, Lind & Ponack

[57] ABSTRACT

A hub clutch in which when an axle shaft commences to be driven, protruding cam portions of a first cam which is axially movably splined to the outside circumference of a driving gear formed integrally with the axle shaft is displaced from the inside of respective grooved cam portions of a second cam and a cam ring to the outside along an axial direction. Thereafter, the first cam is further displaced to the outside in the axial direction along a second cam portion of the cam ring, and a clutch ring is displaced in the direction of clutched engagement through a shift spring, at which a casing is engaged integrally with the driving gear. As a mechanism for maintaining the clutched engagement (locked up state), such members as described above receive a return spring load and are provided for maintaining braking the cam ring which is in contact with the second cam and its stationary system, and at the same time the locked up state derived from the above members is effectively utilized, so that there is no need of an individual mechanism for maintaining on load on the cam ring.

4 Claims, 32 Drawing Figures

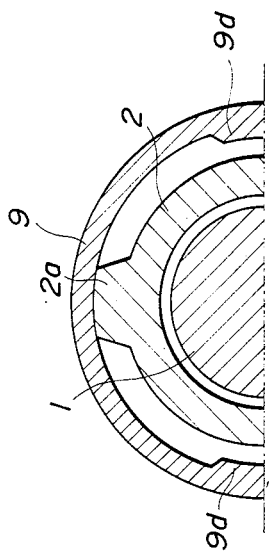
Fig. 3(B)
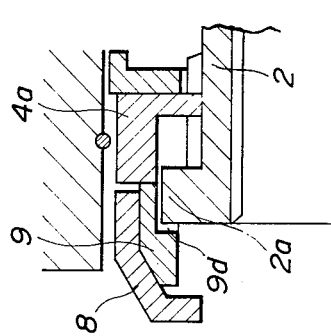
Fig. 4(B)
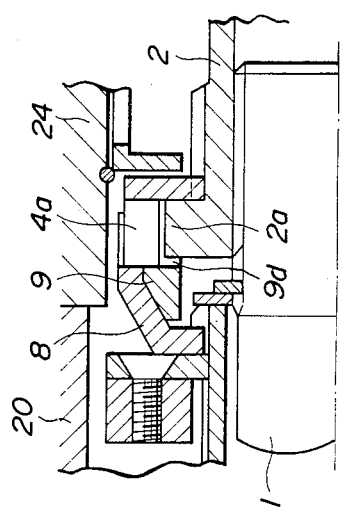
Fig. 3(A)
Fig. 4(A)

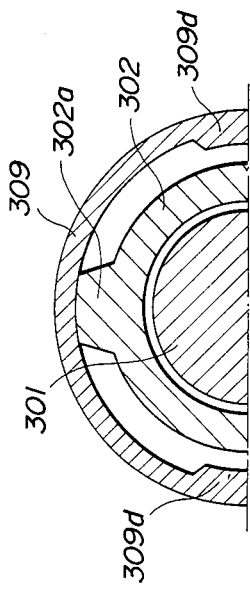
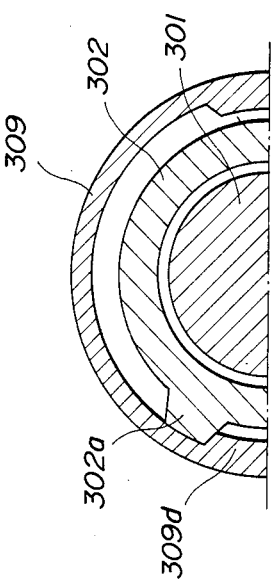
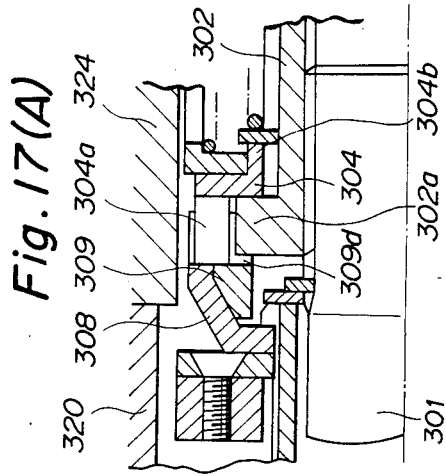
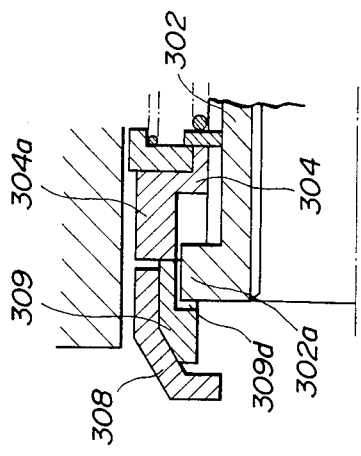

HUB CLUTCH

BACKGROUND OF THE INVENTION

1. Field of the Invention

This invention relates to hub clutches, and more particularly to an automatic free wheel hub clutch.

2. Description of the Related Art

An example of conventional automatic free wheel hub clutches (hereinafter referred to simply as "hub clutch") includes the one disclosed in U.S. Pat. No. 4,327,821 which comprises clutching splines and other splines formed on the outside circumference of a driving shaft and which are capable of engaging a clutch ring engaged slidably movably with splines on the inside circumference of a body, the clutch ring having splines capable of being in clutched engagement with said clutching splines adjacent the inside circumference, thereof a return spring stretchably provided between a clutch cap (covering member) and said clutch ring for urging the clutch ring towards the inside in the axial direction (clutched off direction), a cam follower disposed adjacent to the inside of the clutch ring in the axial direction and engaging movably along the axial direction with the other splines on the outside circumference of said driving shaft, said cam follower having a V-shaped projection projecting inwardly in the axial direction and a protrusion (tooth) formed on the outside circumference of the extreme end of said V-shaped projection and protruding towards the outside diameter direction, a cam member provided with a V-shaped grooved cam surface for mating with the V-shaped projection of said cam follower to seat it thereat on the outer circumference at the extreme end of the outside in the axial direction and secured to a stationary system (lock nut), a movable cam disposed coaxially on the outside diameter side of the cam member in a rotatable state and having a cam surface having a substantially V-shaped projection on the outside in the axial direction as well as a cam stop at the extreme end of said cam surface, and a drag shoe damping the movable cam with respect to the stationary system. A thrust washer is disposed at a sliding section defined between the inside surface of the drag shoe in the axial direction and the outside surface of the lock nut and which supports such urging force transmitted from the return spring through the clutch ring, the cam follower, the movable cam, and the drag shoe. On the inside diameter side of said return spring, a shift spring is coaxially disposed which is stretchably provided between the clutch cap and the clutching spline. Said clutch ring is in face to face contact with the cam follower in a slidable state.

In the above construction, when torque is transmitted from said other spline to the cam follower by rotating the driving shaft, the V-shaped projection of the cam follower which has been fitted into the V-shape grooved cam surface of the cam member shifts to the outside in the axial direction along said V-shaped grooved cam surface. When said V-shaped projection gets over said V-shaped groove, the projection at the extreme end engages, at this time, with the V-shaped protruding cam surface of the movable cam (rotation of which is suppressed by the drag shoe), and shifts towards the outside in the axial direction along the same. At the time when said projection gets over the V-shaped groove, the clutching spline on the outer circumference of the driving shaft is already in clutched engagement with the clutch ring, and the locking state thereof becomes deeper with the shift of the projection towards the outside in the axial direction along the projecting cam surface of the movable cam, and such a locking state finishes when the projection engages with a cam stop. The drag shoe controls the movable cam so that such a clutched engagement as described above can be maintained.

Furthermore all of said clutching splines and the other splines are disposed on the driving shaft adjacently to each other in an axially movable condition, and the displacement of these splines towards the outside in the axial direction is elastically suppressed by means of the shift spring provided stretchably between the clutching splines (positioned outwardly along the axial direction) and said clutch cap.

In conventional hub clutches, however, when a clutch is engaged (in case of locking condition), the urging force from a return spring is received by a thrust washer through a clutch ring, a cam follower, a movable cam, a drag shoe and the like. Hence the spring load in this case has no function and it produces a wasted force. Furthermore wear or durability in an engaged portion where load is received thereby are affected, so that there is a fear of an accompanying decrease in performance. Besides, the drag shoe functions to maintain the clutched engagement condition (one before a projection of the cam follower engages with a cam stop after having engaged with a V-shape projecting cam of the movable cam), while such a function itself of commencing the clutched on-off operation is performed by a cam member which is a stationary system. In other words, the function for starting the clutched on-off operation and the function for maintaining the clutched on condition are shared by separate members so that the members used are increased and the construction therefor becomes complicated.

In addition, since a cam mechanism producing a thrust force required for clutched engagement is comprised of cam surfaces sliding with each other, the brake section generating damping force for the cams may require a high damping resistance so that there is a possibility of a decrease in decreasing durability. On one hand, if the damping resistance is insufficient, the clutching operation becomes unreliable.

Moreover, in conventional hub clutches, since the inside end surface of said clutch ring in the axial direction contacts slidably with the outside end surface of the cam follower, there is a possibility of wearing the sliding surface of said clutch ring and said cam follower (sliding due to relative rotation of both the members) by means of the load from the return spring and the shift spring in the case of ratcheting of the clutching spline and the clutch ring (such a state where both the end surfaces merely contact with each other and no meshing is observed) in the course of shifting a locked state, and as a result there is also a possibility of a reduction in durability. More specifically, the clutching spline is urged by the cam follower towards the outside along the axial direction at the time of ratcheting, so that the clutching spline is displaced outwardly in the axial direction to compress the shift spring. Thus, in addition to the urging force from the return spring, another urging force, i.e. a reaction force of the shift spring, is applied to the contacting surface (sliding surface) of the clutch ring and the cam follower, so that wear of said sliding surface is accelerated by a synergistic effect derived from both the urging forces and the durability thereof decreases remarkably.

SUMMARY OF THE INVENTION

In view of the above, an object of the present invention is to provide a hub clutch by which local sliding wear due to an urging force of a return spring is prevented to eliminate the loss of spring force so that reinforcement with respect to the locality becomes unnecessary. The construction of said hub clutch is simplified in such a manner that the return spring force at the time of clutched engagement is utilized to obtain a resistance for maintaining the engagement.

A further object of the present invention is to provide a hub clutch wherein the cam portion is constructed to utilize a rolling resistance in order to elevate durability of the brake section for the cams and to make the clutching operation positive.

A still further object of the present invention is to provide a hub clutch wherein no urging force of the return spring is applied to the undermentioned sliding section in order to reduce wear in said sliding section formed by a member on the housing side and a member on the driving shaft side in case of ratcheting to elevate the durability.

BRIEF DESCRIPTION OF THE DRAWINGS

Embodiments of the invention will now be described, by way of examples with reference to the accompanying drawings, in which:

FIG. 1 through FIG. 4, inclusive, illustrate the first embodiment of the present invention wherein;

FIG. 1 is a whole constructional explanatory view showing clutched off and on conditions, FIGS. 3A, 3B and FIGS. 4A, 4B are views illustrating engaged states of a projection of the driving gear as well as a projection of the cam ring in the clutched on and off mode, respectively, FIGS. 5, 6, and 7 are explanatory views each illustrating a modification of the first embodiment of the present invention, FIGS. 8A, 8B through FIG. 11, inclusive, illustrate the second embodiment of the present invention wherein;

FIGS. 12, 13, and 14 are explanatory views each illustrating a modification of the second embodiment of the present invention, FIG. 15 through FIGS. 19A, 19B, and 19C, inclusive, illustrate the third embodiment of the present invention wherein;

FIGS. 17A, 17B and FIGS. 18A, 18B are views illustrating engaged states of a projection of the driving gear as well as a projection of the cam ring in clutched on and off modes, respectively.

DETAILED DESCRIPTION OF PREFERRED EMBODIMENTS

The hub clutch according to the present invention will be described in detail hereinbelow.

Figure 1:
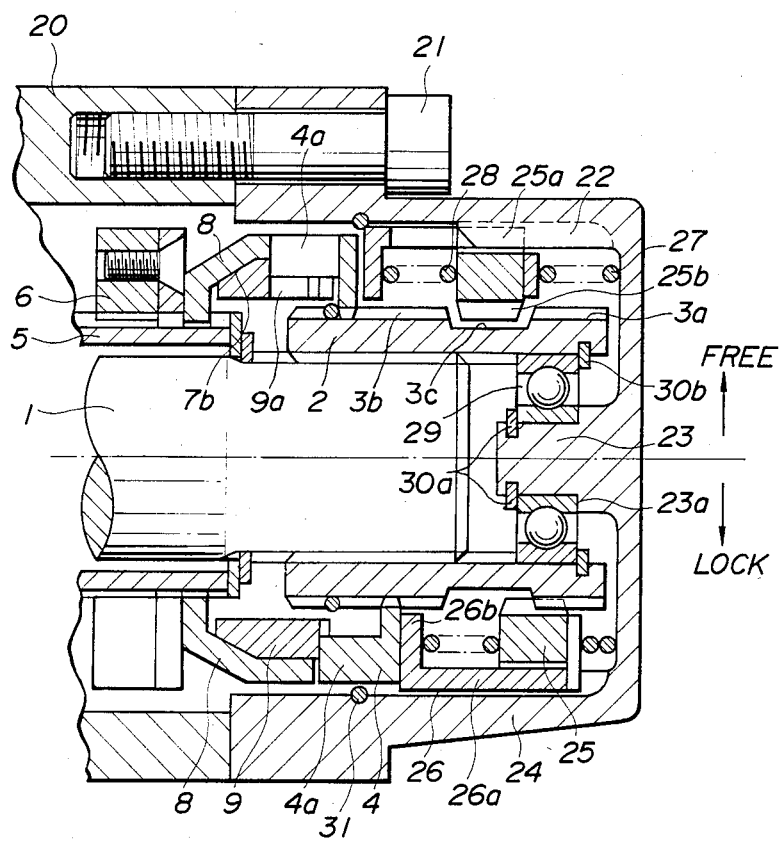
Figure 2A:
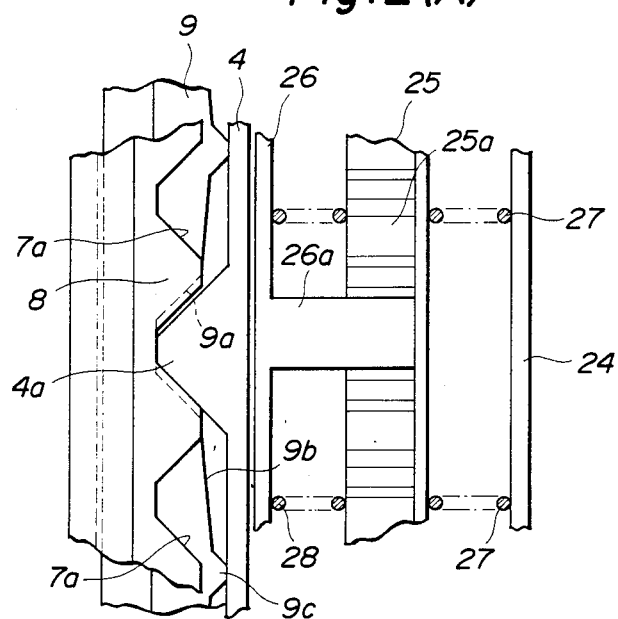
FIGS. 2A and 2B are views illustrating engaged states of the respective cam portions in the clutched on and off mode.
Figure 2B:
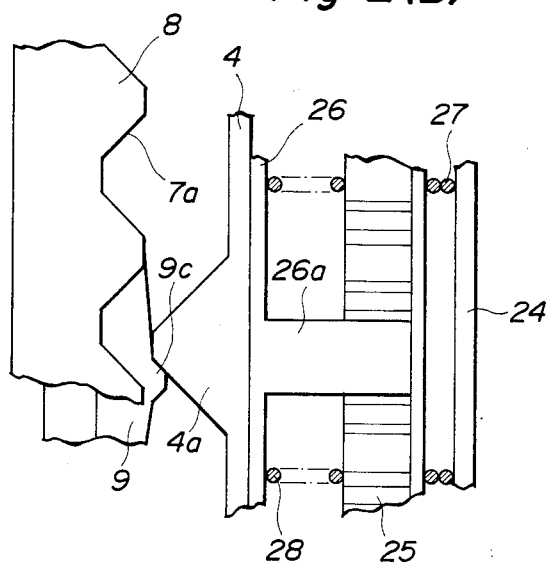

In an embodiment of the present invention shown in FIGS. 1, 2A, 2B, 3A and 3B, a hub clutch comprises a driving gear 2, a first cam 4, a second cam 8, a cam ring 9, a casing 24, a ring clutch 25, a retainer 26, a return spring 27, and a shift spring 28. In the hub clutch, the driving gear 2 is fixedly splined to the outside surface of an axle shaft 1 at the extreme end thereof and said driving gear has a first spline 3a, a second spline 3b and a non-spline portion 3c for locking the clutch at the outside surface thereof. The first cam 4 is in splined engagement with the second spline 3b so as to be axially movable and said first cam is provided with a V-shaped projecting cam portion 4a at the inside edge in its axial direction. Rotation of the second cam 8 is prevented by means of a stationary system (comprising a spindle 5, a lock nut 6 and the like), and said second cam has a plurality of V-grooved cam portions 7a into which a thick portion on the outside diameter side of the cam portion 4a of said first cam is fitted at the outside edge in its axial direction and has also a conical friction surface 7b on the inner periphery thereof. The cam ring 9 has a V-grooved first cam portion 9a into which a thick portion on the inside diameter side of the cam portion 4a is fitted at the outside edge in its axial direction and also has second cam portions 9b and stoppers 9c positioned on opposite sides to each other with reespect to the first cam portion 9a. Said cam ring further forms a brake surface generating a required damping force due to sliding of the outside circumferential surface thereof along and with respect to the friction surface 7b of the inner periphery of the second cam 8. The inside circumferential surface of the casing 24 is secured to a wheel hub 20 by a bolt 21 and possesses a spline 22. Furthermore said casing is provided with a projection 23 at the central portion inside the end surface thereof. The ring clutch 25 has a spline 25a engaged movably with a spline 22 of the casing 24 along its axial direction on the outside circumferential surface thereof as well as a spline 25b clutching at the first spline 3a of the driving gear in on-off action on the inside circumferential surface thereof. Rotation of the retainer 26 is suppressed by means of the spline 22, and said retainer is provided with a retainer arm 26a and a bent portion 26b extending towards the inside diameter at the inside thereof along its axial direction. The return spring 27 is stretchably provided between the inside wall at the end surface of the casing 24 and the outside surface of the ring clutch 25 along the axial direction thereof thereby urging the ring clutch 25 towards the inside in its axial direction (clutching on-off direction). The shift spring 28 is stretchably provided between the bent portion 26b of the retainer and the inside wall surface of the ring clutch 25 along the axial direction thereof thereby urging the ring clutch 25 towards the outside in its axial direction (clutching on-off direction). The return spring 27 produces a stronger expanding force than that of the shift spring 28. The extreme end of the driving gear 2 projects from the extreme end of the axial shaft 1, and a bearing 29 is disposed between the inner periphery of the extreme end of the axle shaft 1 and the projection 23 of the casing. The inside diameter portion of the bearing 29 is locked by a stepped portion 23a of the projection 23 as well as a snap ring 30a, while the outside diameter portion thereof is locked in the driving gear 2 by means of a snap ring 30b, whereby displacement of the bearing in the axial direction is prevented. Reference numeral 31 designates a snap ring restricting displacement of the retainer in the axial direction. In FIG. 1, the upper half part above the center line therein shows the clutched off (two wheel drive) mode, while the lower half part shows the clutched on (four wheel drive) mode, respectively. FIGS. 3A, 3B as well as FIGS. 4A, 4B show positional relationships between a projection 2a on the outer circumference of the driving gear and a projection 9d on the inner circumference of the cam ring 9 in free (clutched off) and locked up (clutched on) modes, respectively.

In the above construction, the operation for switching from the clutched off mode (FIG. 2A) shown in the part above the center line in FIG. 1 to the clutched on mode (FIG. 2B) shown in the part under the center line will be described hereinbelow.

First, when driving force from the engine is transmitted to the axle shaft 1, the driving gear 2 and the first cam 4 start their integral rotation. In the clutched off mode, the cam portions 4a of the first cam 4 are simultaneously fitted in and engaged with the grooved cam portion 7a of the second cam 8 and the first cam portion 9a of the cam ring 9. When the first cam 4 commences to be rotated by rotation of the axle shaft 1, the cam portion 4a is displaced towards the outside in the axial direction along the respective cam surfaces of the cam portions 7a and 9a by means of the thrust force imparted toward the outside in the axial direction which is generated at the respective cam surfaces. The cam portion 4a gets over the grooved cam portions 7a and 9a, and moves onto the second cam portion 9b of the cam ring. Then, the cam portion is displaced towards the outside in the axial direction along the second cam portion 9b and abuts against the stopper 9c to cease the displacement in the axial direction. The relative rotation between the cam ring 9 and the first cam 4 in this case is due to resistance caused by the urging of the cam ring 9 into contact with the second cam 8 as a result of receiving the reaction force of the return spring 27 through the first cam 4. When the return spring 27 is bent due to the shift of the first cam 4 in the axial direction, the ring clutch 25 is displaced outwardly in the axial direction by means of the shift spring 28 so that the spline 25a is completely meshed with the spline 3a (The lower half part of FIG. 1 and FIG. 2B). Thus, a complete clutched on mode has been attained, and the projection 2a on the outside circumference of the driving gear engages with the projection 9d on the inside circumference of the cam ring 9 to rotate directly the cam ring 9, whereby rotational torque is transmitted.

Next, the operation in which four wheel drive mode is switched over to two wheel drive mode will be described hereinbelow.

After transmission of the driving force to the axial shaft 1 is shut off, the car body is moved back slightly in the direction opposite to that along which the car has been just driven, whereby the cam portion 4a of the first cam 4 is moved away from the stopper 9c by means of expanding force of the return spring 27, and the cam portion 4a is displaced inwardly in the axial direction along the cam portion 9b, until the cam portion 4a finally drops into the cam portion 7a of the second cam 8 and the cam portion 9a of the cam ring 9. Thus, the clutched off mode is realized. In the course of displacement of the first cam 4 towards the inside along the axial direction, the spline 25b of the clutch ring 25 is released from meshing with the spline 3a to return within the non-spline portion 3c. The non-spline portion 3c is dimensioned so as to possess a width in the axial direction which does not obstruct rotation of the clutch ring 25 at the time of two wheel driving. Shifting of the retainer 26 along the axial direction is restricted by the snap ring 31 to be returned to a non-contact state with the first cam 4. Since the spline 22 of the casing is used for only carrying slidably the clutch ring 25, there is no need for constructing the spline with material having high strength and heavy weight such as steel and the like. Hence weight-saving can be attained by utilizing aluminum alloy or the like.

Figure 5:
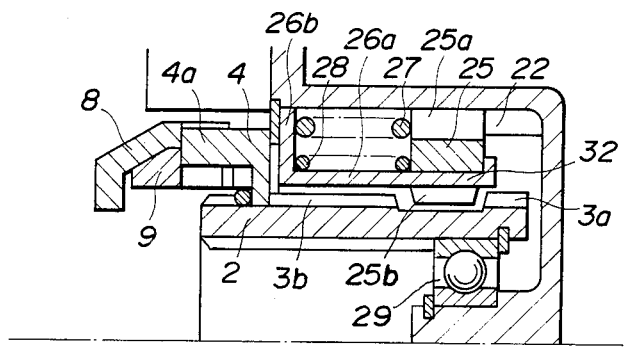

FIG. 5 is an explanatory view showing a modification of the first embodiment according to the present invention wherein like reference characters designate like or corresponding parts in FIG. 1 and the common description thereof will be omitted. The present modification differs from the first embodiment in that an arm 26a of a retainer 26 is axially passed through a clutch ring 25 and the extreme end of which forms a bent stopper 32. A bent portion 26b disposed towards the direction of the outside diameter is formed inside the retainer in the axial direction, and a return spring 27 disposed between both the inner walls of a casing 24 and the bent portion 26b of the retainer is stretchably provided in parallel with a shift spring 28 disposed between the clutch ring 25 and the inner wall of the bent portion 26b.

Figure 6:
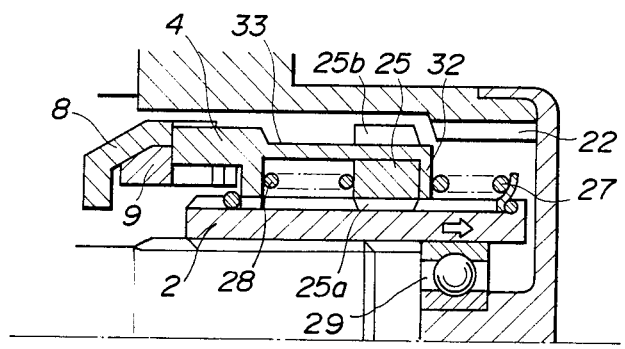

FIG. 6 illustrates the second modification of the embodiment according to the present invention and which differs from the embodiment and the modification described above in that a cam-retainer member 33 is integrally formed with a retainer and a first cam, a clutch ring 25 is constructed such that it is slidably engaged with a driving gear 2 to be clutched on-off with a spline 22 of a casing, and a return spring 27 disposed between the extreme end of the driving gear 2 and a stopper 32 (clutch ring 25) is stretchably provided in series with a shift spring 28 disposed between the inner wall of the cam-retainer member 33 and the clutch ring 25. According to the construction as described above, since an urging force is always applied to the driving gear by means of the return spring 27 in the direction of arrow, no snap ring is required for preventing the displacement of bearing 29.

Figure 7:
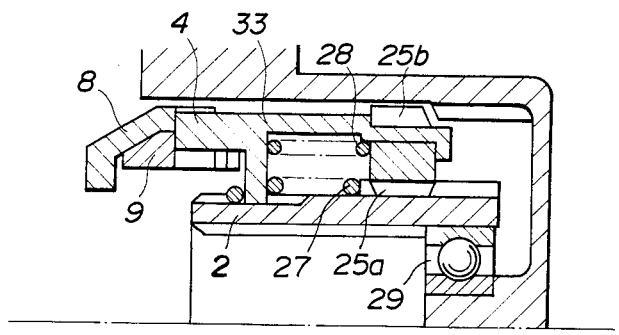

FIG. 7 illustrates yet another modification wherein the engagement of a cam-retainer member 33 with a clutch ring 25 is the same as in said second modification, but the present modification differs therefrom in that a return spring 27 disposed between both the inner walls of a driving gear 2 and the cam-retainer member 33 is stretchably provided in parallel with a shift spring 28 disposed between a clutch ring 25 and the cam-retainer member 33.

In the present modification, snap rings for preventing the displacement of bearing 29 may also be omitted.

In brief, the above-mentioned embodiment and modifications are constructed such that when the axle shaft commences to be driven, the protruding cam portion of the first cam being axially movably splined to the outside circumference of the driving gear formed integrally with the axle shaft is displaced from the inside of the respective grooved cam portions of the second cam and the cam ring to the outside along the axial direction, thereafter displaced further to the outside in the axial direction along the second cam portion of the cam ring, and the clutch ring is displaced in the direction of clutch engagement through the shift spring, whereby the casing is engaged integrally with the driving gear. As a mechanism for maintaining the clutch engagement (locked up state) in the above case, such members as mentioned above for receiving the return spring load are provided for urging force of braking the cam ring 9 in contact with the second cam 8 of the stationary system, and at the same time the locked up state derived from said members is effectively utilized in the embodiment and the modifications. Thus, there is no need of an individual mechanism for maintaining the return spring load, so that there is little power loss, the construction therefor can be simplified, and the cost therefor can also be reduced.

Next, the second embodiment of the present invention will be described hereinbelow.

Figure 10B:
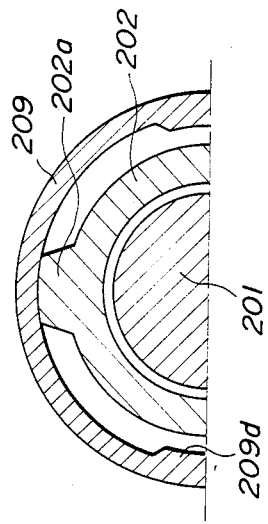
FIGS. 10A, 10B and FIGS. 11A, 11B are views illustrating engaged states of a projection of the driving gear as well as a projection of the cam ring in clutched on and off modes, respectively.
Figure 11B:
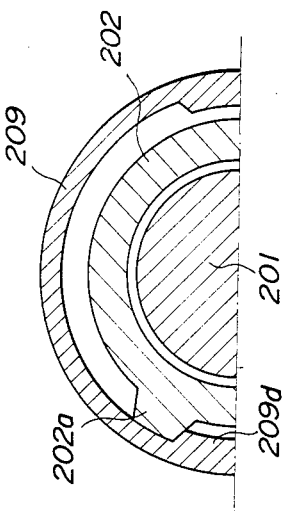
Figure 10A:
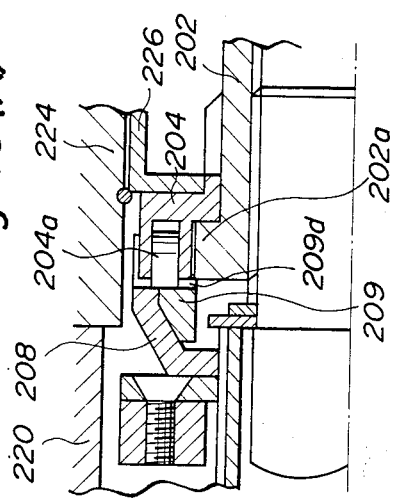
Figure 11A:
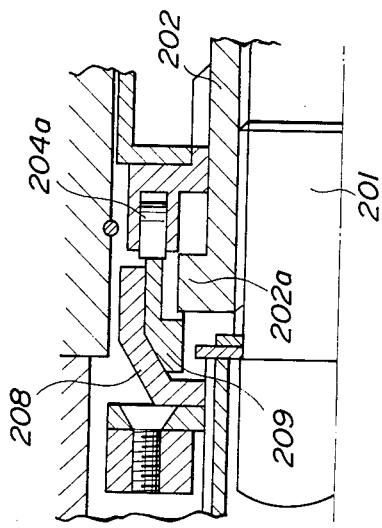

In the second embodiment of the present invention shown in FIGS. 8, 9A, 9B, 10A and 10B, a hub clutch comprises a driving gear 202, a moving body 204, a cam 208, a cam ring 209, a casing 224, a ring clutch 225, a retainer 226, a return spring 227, and a shift spring 228. In the hub clutch, the driving gear 202 is fixedly splined to the outside surface of an axle shaft 201 at the extreme end thereof and said driving gear has a first spline 203a and a second spline 203b for locking the clutch at the outside surface thereof. The moving body 204 is in splined engagement with the spline 203 so as to be axially movable and is provided with a rolling body 204a, which will be mentioned hereinbelow, at the inside edge in its axial direction. Rotation of the cam 208 is prevented by means of a stationary system (comprising a spindle 205, a lock nut 206 and the like), and said cam has a plurality of V-grooved cam portions 207a into which a thick portion on the outside diameter side of the rolling body 204a is fitted at the outside edge in its axial direction and has also a friction surface 207b on the inner periphery thereof. The cam ring 209 has a V-grooved first cam portion 209a into which a thick portion on the inside diameter side of the rolling body 204a is fitted at the outside edge in its axial direction and also has second cam portions 209b and stoppers 209c positioned on opposite sides to each other with respect to the first cam portion 209a. Said cam ring further forms a brake surface generating a required damping force due to the sliding of the outside circumferentially surface thereof along and with respect to the friction surface 207b of the inner periphery of the cam 208. The inside circumference surface of the casing 224 is secured to a wheel hub 220 by a bolt 221 and possesses a spline 222. Furthermore said casing is provided with a projection 223 at the central portion inside the end surface thereof. The ring clutch 225 has a spline 225a engaged movably with a spline 222 of the casing 224 along its axial direction on the outside circumferential surface thereof as well as a spline 225b clutching at the first spline 203a of the driving gear in on-off action on the inside circumferential surface thereof. Rotation of the retainer 226 is suppressed by means of the spline 222, and said retainer is provided with a retainer arm 226a and a bent portion 226b disposed towards the inside diameter at the inside thereof along its axial direction. The return spring 227 is stretchably provided between the protruding portion forming the first spline 203a and a spring engaging member engaging with the second spline 203b of the driving gear 202 and the movement of which is permitted to become stationary towards the inside in its axial direction by means of the arm 226a of the retainer 226 thereby urging the ring clutch 225 towards the inside along the axial direction (clutching on-off direction). The shift spring 228 is stretchably provided between the bent portion 226b of the retainer 226 and the inside wall of the ring clutch 225 along the axial direction thereof thereby urging the ring clutch 225 towards the outside in its axial direction (clutching on-off direction). The return spring 227 produces a stronger expanding force than that of the shift spring 228. The extreme end of the driving gear 202 projects from the extreme end of the axle shaft 201, and a bearing 229 is disposed between the inner periphery of the extreme end of the axle shaft 201 and the projection 223 of the casing. In FIG. 8A, the upper half part above the center line therein shows the clutched off (two wheel drive) mode, while the lower half part shows the clutched on (four wheel drive) mode, respectively. FIGS. 10A, 10B as well as FIGS. 11A, 11B show positional relationships between a projection 202a on the outer circumference of the driving gear and a projection 209d on the inner circumference of the cam ring 209 in free (clutched off) and locked up (clutched on) modes, respectively. Furthermore the rolling body 204a may have a bearing-like construction as shown in FIG. 8B, but it is not limited thereto.

In the above construction, the operation for switching from the clutched off mode (FIG. 9A) shown in the part above the center line in FIG. 8A to the clutched on mode (FIG. 9B) shown in the part under the center line will be described hereinbelow.

First, when a driving force from the engine is transmitted to the axle shaft 201, the driving gear 202 and the first cam 204 start their integral rotation. In the clutched off mode, the rolling bodies 204a of the moving body 204 are simultaneously fitted in and engaged with the grooved cam portion 207a of the cam 208 and the first cam portion 209a of the cam ring 209. When the moving body 204 commences to be rotated by rotation of the axle shaft 201, the rolling body 204a is displaced towards the outside in the axial direction along the respective cam surfaces of the cam portions 207a and 209a by means of the thrust force imparted towards the outside in the axial direction which is generated by the rolling body 204a rolling on the respective cam surfaces. The rolling body 204a gets over the grooved cam portions 207a and 209a, and moves onto the second cam portion 209b of the cam ring. Then, the rolling body is displaced towards the outside in the axial direction along the second cam portion and abuts on the stopper 209c to cease the displacement of the first cam in the axial direction. The relative rotation between the cam ring 209 and the moving body 204 in this case is due to resistance caused by urging the cam ring 209 into contact with the cam 208 as a result of receiving the reaction force imparted by the return spring 227 through the first cam 204. When the return spring 227 is bent due to shifting of the moving body 204 in the axial direction, the ring clutch 225 is displaced outwardly in the axial direction by means of the shift spring 228 so that the spline 225a is completely meshed with the spline 203a (The lower half part of FIG. 8 and FIG. 9B). Thus, a complete clutched on mode has been attained, and the projection 202a on the outside circumference of the driving gear engages with the projection 209d on the inside circumference of the cam ring 209 to rotate directly the cam ring 209, whereby rotational torque is transmitted.

Next, the operation in which the four wheel drive mode is switched over to the two wheel drive mode will be described hereinbelow.

After transmission of the driving force to the axle shaft 201 is shut off, the car body is moved back slightly in the direction opposite to that along which the car has been just driven, whereby the rolling body 204a of the moving body 204 is moved away from the stopper 209c by means of the expanding force of the return spring 227, and the rolling body is displaced inwardly in the axial direction along the cam portion 209b, the rolling body 204a finally dropping into the cam portion 207a of the cam 208 and the cam portion 209a of the cam ring 209. Thus, the clutched off mode is realized. In the course of displacement for the first cam 204 towards the inside along the axial direction, the spline 225b of the clutch ring 225 is released from meshing with the spline 203a to return to the clutched off position. Since the spline 222 of the casing is used for only slidably carrying the clutch ring 225, there is no need for constructing the spline with a material having high strength and heavy weight such as steel and the like. Hence weight-saving can be attained by utilizing aluminum alloy or the like.

Figure 8:
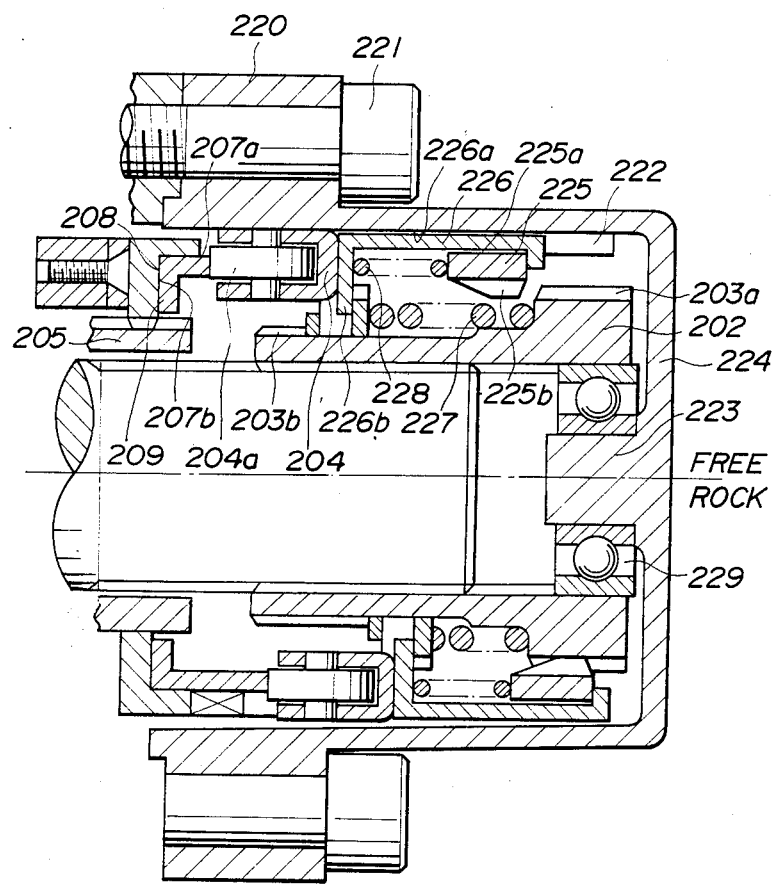
FIG. 8A is a whole constructional explanatory view showing clutched off and on conditions.
FIG. 8B is a sectional view showing a rolling cam.
Figure 8:
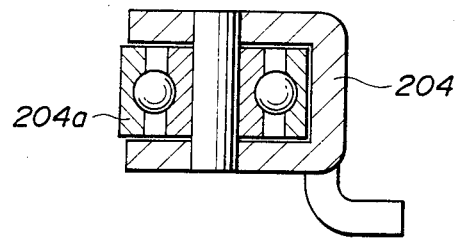
Figure 9A:
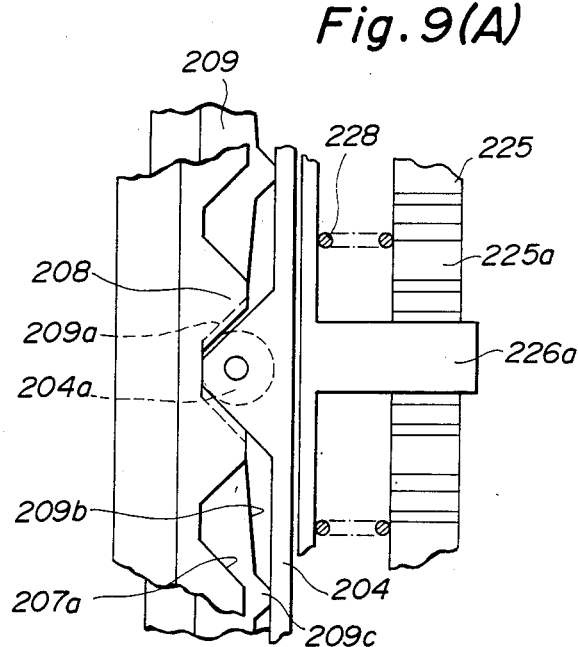
FIGS. 9A and 9B are views illustrating engaged states of the respective cam portions in clutched on and off modes, respectively
Figure 9B:
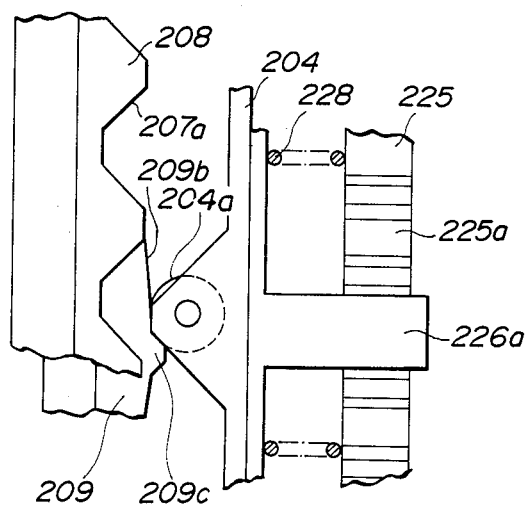
Figure 12:
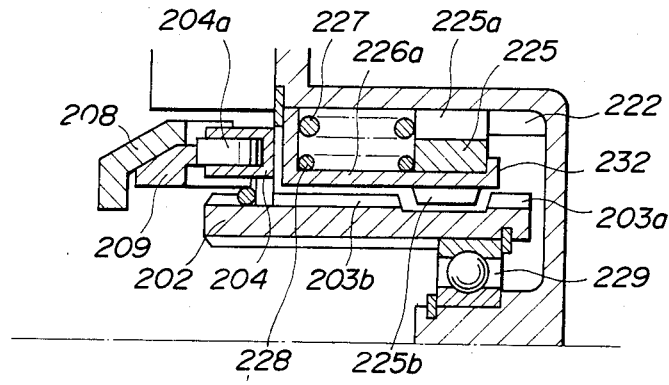

FIG. 12 is an explanatory view showing a modification of the second embodiment according to the present invention wherein like reference characters designate like or corresponding parts in FIG. 8 and the common description thereof will be omitted. The present modification differs from the second embodiment in that an arm 226a of a retainer 226 is axially passed through a clutch ring 225 and the extreme end of which forms a bent stopper 232. A bent portion 226b disposed towards the direction of the outside diameter is formed inside the retainer in the axial direction.

Figure 13:
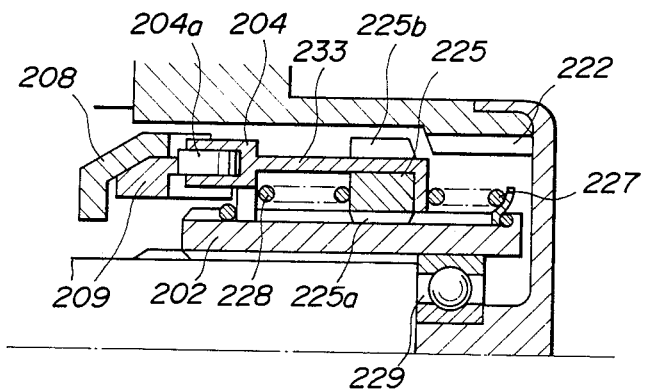

FIG. 13 illustrates a still further modification of the embodiment according to the present invention and which differs from the embodiments and the modifications described above in that a cam-retainer member 233 is integrally formed with a retainer and a first cam, a clutch ring 225 is constructed such that it is slidably engaged with a driving gear 202 to be clutched on-off with a spline 222 of a casing, and a return spring 227 disposed between the extreme end of the driving gear 202 and a stopper 232 (clutch ring 225) is stretchably provided in series with a shift spring 228 disposed between the inner wall of the cam-retainer member 233 and the clutch ring 225. According to the construction as described above, since an urging force is always applied to the driving gear by means of the return spring 227 in the direction of the arrow, no snap ring is required for preventing displacement of bearing 229.

Figure 14:
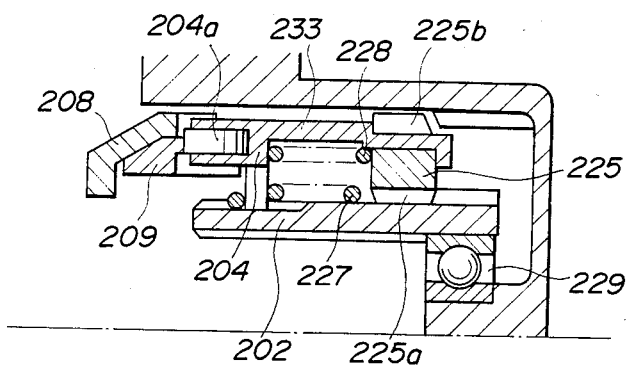
Figure 15:
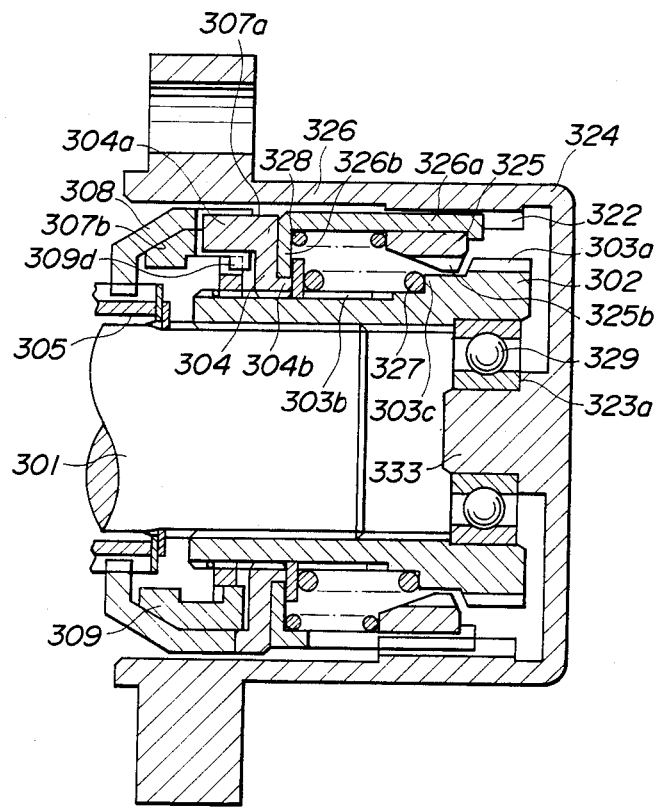
FIG. 15 is a whole constructional explanatory view showing clutched off and on conditions.

FIG. 14 illustrates yet another modification wherein the engagement of a cam-retainer member 233 with a clutch ring 225 is the same as in said second modification, but the present modification differs therefrom in that a return spring 227 disposed between both the inner walls of a driving gear 202 and the cam-retainer member 233 is stretchably provided in parallel with a shift spring 228 disposed between a clutch ring 225 and the cam-retainer member 233.

In the present modification, snap rings for preventing displacement of bearing 229 may also be omitted.

In brief, the above-mentioned second embodiment and modifications are constructed such that such engaging portion of the moving body shifted with the cam utilizes rolling resistance for engaging and disengaging the ring clutch, whereby brake resistance may be reduced so that durability of the brake section for the cam is increased and the clutching operation becomes positive.

Next, the third embodiment of the present invention will be described hereinbelow.

In the third embodiment of the present invention shown in FIGS. 15 through 19A, 19B, 19C, inclusive, a hub clutch comprises a driving gear 302, a first cam 304, a second cam 308, a cam ring 309, a casing 324, a ring clutch 325, a retainer 326, an over hanging portion 304b, a return spring 327, and a shift spring 328. In the hub clutch, the driving gear 302 is fixedly splined to the outside circumference of an axle shaft 301 at the extreme end thereof and said driving gear has a first spline 303a and a second spline 303b for locking the clutch at the outside circumference thereof. The first cam 304 is in splined engagement with the second spline 303b so as to be axially movable and has a V-shaped protruding cam portion 304a at the inside edge in its axial direction. Rotation of the second cam 308 is prevented by means of a stationary system (comprising a spindle 305, a lock nut 206, not shown, and the like), and said second cam has a plurality of V-grooved cam portions 307a into which a thick portion on the outside diameter side of the cam portion 304a of the first cam is fitted at the outside edge in its axial direction and has also a friction surface 307b on the inner periphery thereof. The cam ring 309 has a V-grooved first cam portion 309a into which a thick portion on the inside diameter side of the cam portion 304a is fitted at the outside edge in its axial direction and also has second cam portions 309b and stoppers 309c positioned on opposite sides to each other with respect to the first cam portion 309a. Said cam ring further forms a brake surface generating a required damping force with respect to sliding of the outside circumferential surface thereof along the friction surface 307b of the inner periphery of the second cam 308. The inside circumferential surface of the casing 324 is secured to a wheel hub (not shown) by a bolt and possesses a spline 322. Furthermore, said casing is provided with a projection 323 at the central portion inside the end surface thereof. The ring clutch 325 has a spline 325a engaged movably with a spline 322 of the casing 324 along its axial direction on the outside circumferential surface thereof as well as a spline 325b clutching at the first spline 303a of the driving gear in an on-off action on the inside circumferential surface thereof. The retainer 326, has a retainer arm 326a the rotation of which is suppressed by means of the spline 322 and also has a bent portion 326b disposed towards the inside diameter at the inside of the retainer arm 326a along its axial direction. The over hanging portion 304b projects integrally from the inside diameter portion of the first cam 304 to the outside thereof along the axial direction and the inside circumferential surface of the bent portion 326b of the retainer is carried by the outside circumferential surface thereof. (It is preferable to design the over hanging portion 304b such that it projects beyond the outer surface of the bent portion 326b towards the outside thereof along its axial direction, and the end surface thereof engages with the return spring.)

The return spring 327 is stretchably provided between a stepped portion 303c on the outside circumference of the driving gear 302 and the end surface of the over hanging portion (including the end surface of the retainer) through a spring carrier. The shift spring 328 is stretchably provided between the bent portion 326b of the retainer and the inside wall of the ring clutch 325 along the axial direction thereof thereby urging the ring clutch 325 towards the outside in its axial direction (clutching off direction). The return spring 327 produces a stronger expanding force than that of the shift spring 328. The extreme end of the driving gear 302 projects from the extreme end of the axle shaft 301, and a bearing 329 is disposed between the inner periphery of the extreme end of the axle shaft 301 and the projection 323 of the casing. The inside diameter portion of the bearing 329 is locked by a stepped portion 323a of the projection 323, while the outside diameter portion is locked by an inside stepped portion of the driving gear 302, whereby the bearing is prevented from being displaced in the axial direction. Reference numeral 302a designates a projection on the outside circumference of the driving gear and which is engageable with a projection 309d on the inside of the cam ring. The projection 302a may be a body separate from the driving gear 302 as in FIG. 15, and splined thereto, and secured by means of a snap ring, or the projection may be integrally formed as shown in FIGS. 17A, 17B and FIGS. 18A, 18B.

In FIGS. 19A, 19B, and 19C, damping between the second cam 308 and the cam ring 309 is not effected by means of a conically shaped friction surface, but clutch disks 350 and 351. While the second cam 308 is the same as that of the embodiment shown in FIG. 15 in that it is provided with the grooved cam portion 307a and a pawl portion 308a, the second cam differs therefrom in that a notch 308a for fitting a lag part 351a, the lag part being an outer covering for the clutch disk 351, is defined in place of the friction surface 307b. Although the cam ring 309 is the same as that of the embodiment shown in FIG. 15 in that it is provided with the first cam portion 309a, the second cam portion 309b and the stopper 309c, the cam ring differs therefrom in that a notch 309f for fitting a lag part 350a on the inside diameter side for the clutch disk 350 is defined on a cylindrical projection 309e. The projection 309e is fitted into a central hole of each clutch disk. Rotation of each clutch disk 351 is prevented by the first cam portion 309a, and at the same time it is allowed to shift along the axial direction within a prescribed range. One clutch disk 350 is placed between the respective clutch disks 351, and the lag portion 350a is locked movably along the axial direction by means of the notch 309f of the cam ring, so that the clutch disk 350 rotates integrally in accordance with the shift of the cam ring 309 in the rotational direction.

Figure 16A:
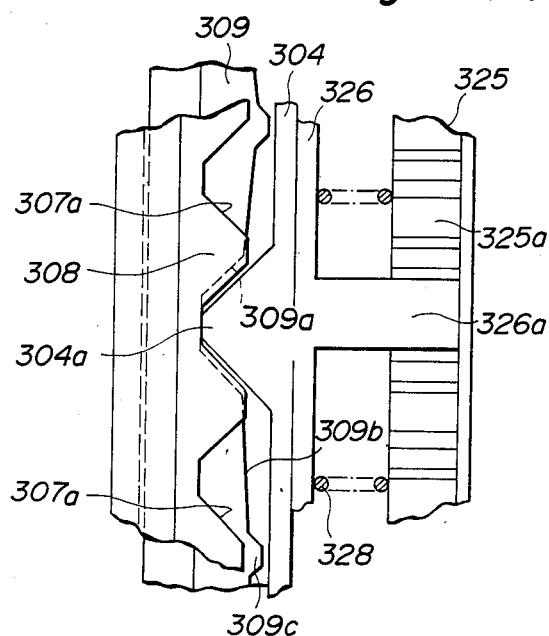
FIGS. 16A and 16B are views illustrating engaged states of the respective cam portions in clutched on and off modes, respectively
Figure 16B:
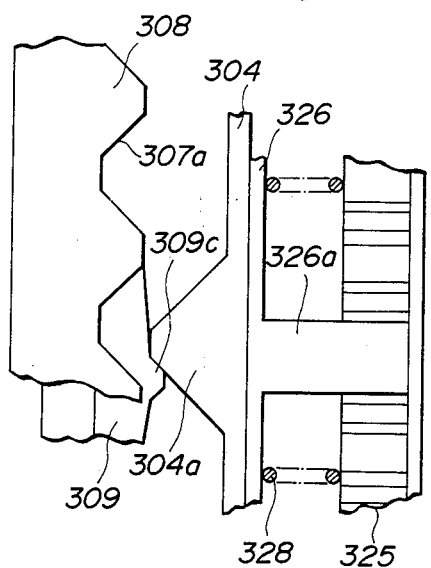
Figure 19:
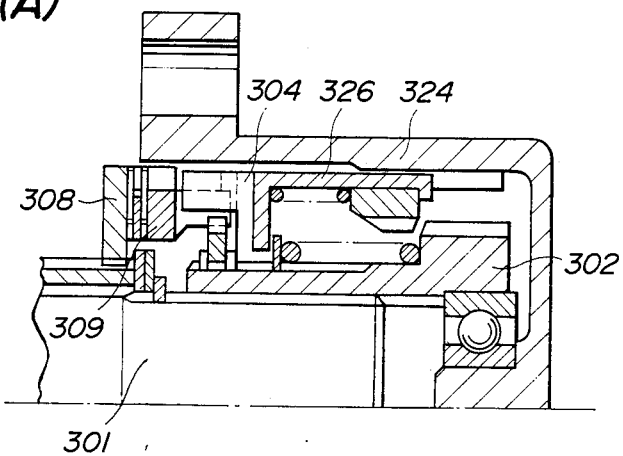
FIGS. 19A, 19B, and 19C are explanatory views illustrating clutched off, ratcheting, and clutched on modes, respectively.
Figure 19:
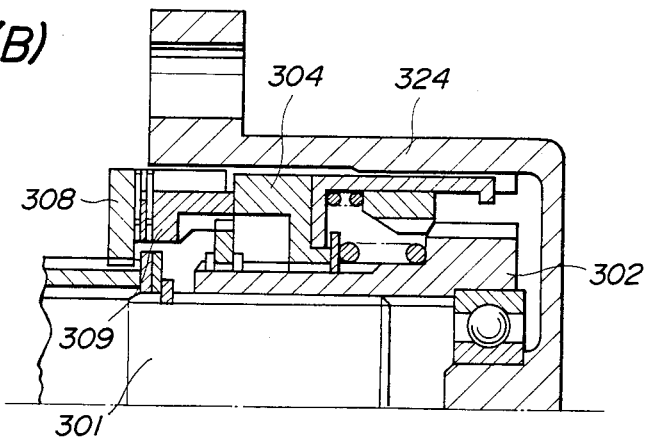
Figure 19:
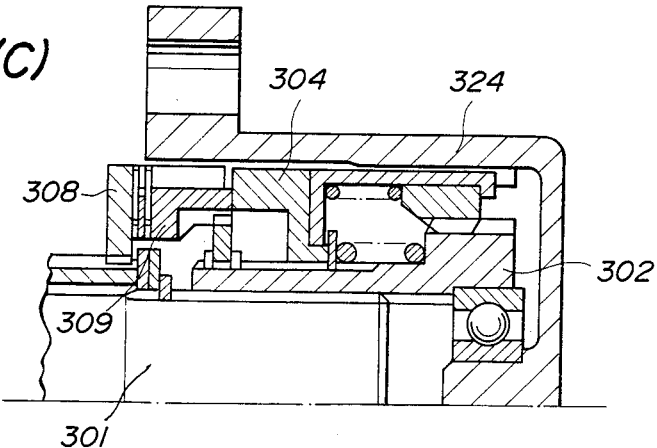

In the above construction, the operation of switching from the clutched off mode shown in FIGS. 16A and 19A to the clutched on mode shown in FIGS. 16B and 19C will be described hereinbelow.

First, when driving force from engine is transmitted to the axle shaft 301, the driving gear 302 and the first cam 304 start their integral rotation. In the clutched off mode, the cam portions 304a of the first cam 304 are simultaneously fitted in and engaged with the grooved cam portion 307a of the second cam 308 and the first cam portion 309a of the cam ring 309. When the first cam 304 commences to be rotated by rotation of the axle shaft 301, the cam portion 304a is displaced towards the outside in the axial direction along the respective cam surfaces of the cam portions 307a and 309a by means of the thrust force acting towards the outside in the axial direction which is generated on the respective cam surfaces. The cam portion 304a gets over the grooved cam portions 307a and 309a, and moves onto the second cam portion 309b of the cam ring. Then, the cam portion is displaced towards the outside in the axial direction along the second cam portion and abuts on the stopper 309c to cease the displacement in the axial direction. When the return spring 327 is bent due to shift of the first cam 304 in the axial direction, the ring clutch 325 is displaced outwardly in the axial direction by means of the shift spring 328 so that the spline 325a is completely meshed with the spline 303a (FIG. 16B) and FIG. 19C). Thus, a complete clutched on mode has been attained, the projection 302a on the outside circumference of the driving gear engages with the projection 309d on the inside circumference of the cam ring 309 to rotate the cam ring 309 directly, whereby rotational torque is transmitted.

Next, the operation in which four wheel drive mode is switched over to two wheel drive mode will be described hereinbelow.

After the transmission of the driving force to the axle shaft 301 is shut off, the car body is moved back slightly in the direction opposite to that along which the car has been just driven, whereby the cam portion 304a of the first cam 304 is moved away from the stopper 309c by means of expanding force of the return spring 327, and the cam portion is displaced inwardly in the axial direction along the cam portion 309b, finally and the cam portion 304a finally drops into the cam portion 307a of the second cam 308 and the cam portion 309a of the cam ring 309. Thus, the clutched off mode is realized. In the course of displacement of the first cam 304 towards the inside along the axial direction, the spline 325b of the clutch ring 325 is released from meshing with the spline 303a. Since the spline 322 of the casing is used only for carrying slidably the clutch ring 325, there is no need to construct the spline with a material having high strength and heavy weight such as steel and the like. Hence weight-saving can be attained by utilizing aluminum alloy or the like.

In the course of operation, from the clutched off mode illustrated in FIG. 19A to the clutched on mode illustrated in FIG. 19C, when the ratcheting state shown in FIG. 19B appears, the return spring 327 is in compressed state. As a result, the reaction force is applied to the over hanging portion 304b, but no reaction force is applied to the retainer 326. In these circumstances, only the reaction force of the shift spring 328 is applied to a contacting part (sliding part) between the outside surface of the first cam in its axial direction and the inside surface of the bent portion 326b of the retainer through the retainer 326. For this reason, even if the contact surfaces of the retainer 326 and the first cam 304 slide against each other as a result of a relative rotation therebetween in case of ratcheting, there is no production of remarkable friction. Accordingly, there is no possibility that durability of the sliding section will be decreased rapidly or the like.

Figure 20:
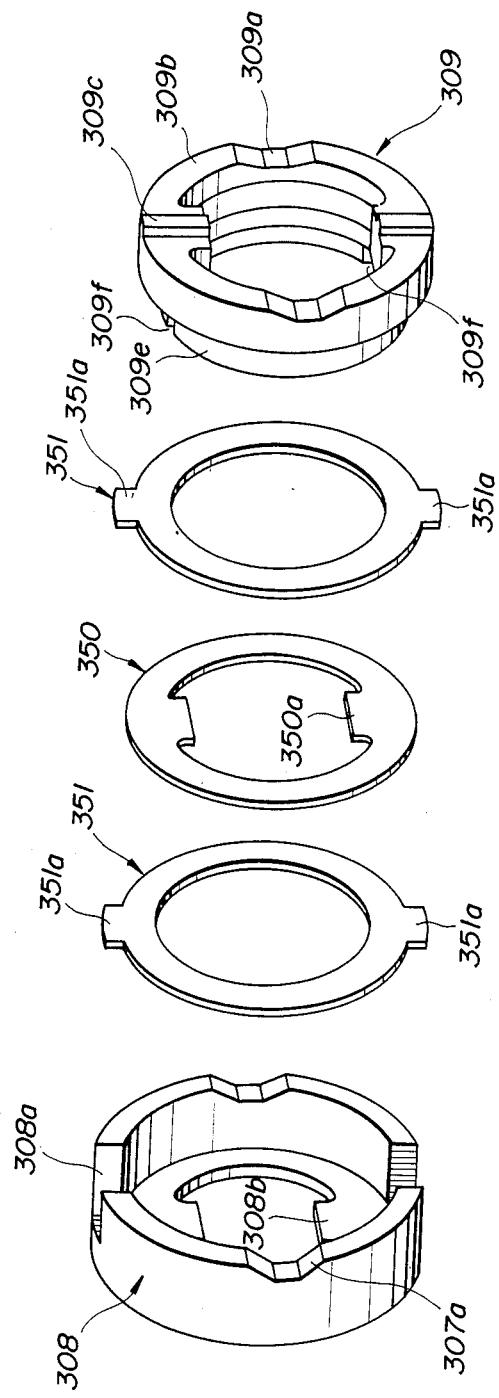
FIG. 20 is a constructional explanatory view showing the brake section of FIG. 19.

In the brake section having the construction shown in FIGS. 19A, 19B and 19C as well as FIG. 20, when the driving shaft commences rotation and the first cam 304 urges the cam ring 309 towards the inside along the axial direction, the respective clutch disks 350 and 351 are forcibly placed in contact with each other between the cam ring 309 and the second cam 308 thereby braking the cam ring 309.

It is to be noted that such modifications wherein the same advantageously effects as those of the above described embodiments are attained by mutually exchanging the protruded projection for the grooved projection are included in the scope of the present invention.

In brief, the third embodiment is constructed that the urging force of the return spring is never applied to the sliding section, so that wear in the sliding section between a member on the housing side and a member on the driving shaft side in case of ratcheting can be reduced and the durability can also be increased.

Although the particular embodiments of the invention have been shown and described, it will occur to those with ordinary skill in the art that other modifications and embodiments exist which fall within the true spirit and scope of the invention as set forth in appending claims.

What is claimed is:

1. A hub clutch for selectively transmitting torque between an axle shaft extending in an axial direction and a wheel hub, said hub clutch comprising:
   a cylindrical casing secured to the wheel hub and having a spline extending along an inner surface thereof;
   a driving gear fixed to an end of the axial shaft within said casing, said driving gear having splines extending along an outer surface thereof;
   a first cam means in splined engagement with said driving gear and movable therealong in said axial direction, said first cam means having cam portions projecting toward an inner side of the hub clutch;
   a second non-rotatable cam adjacent said first cam and cooperating therewith, said second cam having a second cam grooved portion engaging said cam portions of said first cam means;
   a rotatable cam ring in a frictional braking relationship with said second cam and engaging said cam portions of said first cam means,
   said cam ring comprising a cam ring grooved portion, second cam portions and stoppers opposite from one another with respect to said cam ring grooved portion;
   a clutch ring movable in said axial direction between a first clutched position adjacent an outer side of the hub clutch at which the clutch ring operatively connects the splines of said driving gear and the spline of said casing for transmitting torque between the axle shaft to which said driving gear is fixed and the wheel hub to which said casing is fixed and a second unclutched position at which the clutch ring does not transmit torque between the axle shaft and the wheel hub;
   a shift spring for urging said clutch ring toward said clutched position in said axial direction; and
   a return spring for urging said clutch ring toward said unclutched position and for urging said cam ring and said second cam together to maintain said frictional braking relationship,
   the projecting cam portions of said first cam means extending in said second cam grooved portion and in said cam ring grooved portion when said cam ring is in said unclutched position and, when the axle shaft is rotated, said projecting cam portions of said first cam means being urged in said axial direction toward said outer side of the hub clutch by said respective grooved portions whereupon said projecting cam portions follow said second cam portions of said second cam and said first cam means is urged thereby further toward said outer side of the hub clutch for urging said clutch ring toward said clutch position which it attains under the influence of said shift spring and during which said cam ring is maintained in a non-rotatable state relative to said second cam by the frictional braking relationship established therebetween and maintained by said return spring, whereat said first cam portions abut said stoppers and further displacement of said first cam means and said clutch ring toward the outer side of the hub clutch is terminated.

2. A hub clutch as claimed in claim 1,
   wherein said second cam and said cam ring have respective surfaces which abut directly against each other, said frictional braking relationship being established by friction generated between said surfaces and being maintained by said return spring.

3. A hub clutch as claimed in claim 1,
   and further comprising clutch disks disposed between said second cam and said cam ring for establishing said frictional braking relationship, said clutch disks being pressed between said second cam and said cam ring by said return spring for maintaining said frictional braking relationship.

4. A hub clutch as claimed in claim 1,
   wherein said projecting portions each include a rolling body in rolling contact with said second cam and said cam ring.

* * * * *